United States Patent
Bartenstein et al.

(10) Patent No.: US 11,943,294 B1
(45) Date of Patent: Mar. 26, 2024

(54) STORAGE MEDIUM AND COMPRESSION FOR OBJECT STORES

(71) Applicant: Amazon Technologies, Inc., Seattle, WA (US)

(72) Inventors: Christoph Bartenstein, Seattle, WA (US); Brad E Marshall, Bainbridge Island, WA (US); Andrew Kent Warfield, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,938

(22) Filed: Sep. 30, 2020

(51) Int. Cl.
*H04L 67/1097* (2022.01)
*G06N 20/00* (2019.01)
*H04L 67/5651* (2022.01)
*H04L 67/75* (2022.01)
*H04L 69/04* (2022.01)

(52) U.S. Cl.
CPC ......... *H04L 67/1097* (2013.01); *G06N 20/00* (2019.01); *H04L 67/5651* (2022.05); *H04L 67/75* (2022.05); *H04L 69/04* (2013.01)

(58) Field of Classification Search
None
See application file for complete search history.

(56) References Cited

U.S. PATENT DOCUMENTS

| | | | |
|---|---|---|---|
| 6,170,047 B1* | 1/2001 | Dye | G09G 5/39 711/170 |
| 9,384,204 B2 | 7/2016 | Gupta | |
| 9,767,098 B2* | 9/2017 | Patiejunas | G06F 16/113 |
| 10,089,023 B2* | 10/2018 | Malina | G06F 3/0667 |
| 10,176,809 B1* | 1/2019 | Piérard | G10L 15/18 |
| 10,359,960 B1* | 7/2019 | Alshawabkeh | G06F 3/0689 |
| 2014/0237201 A1* | 8/2014 | Swift | G06F 3/065 711/162 |

(Continued)

OTHER PUBLICATIONS

AWS, "Announcing S3 Intelligent-Tiering—A New Amazon S3 Storage Class", Retrieved from https://aws.amazon.com/about-aws/whats-new/2018/11/s3-intelligent-tiering/ on Sep. 29, 2020, Posted Nov. 25, 2018, pp. 1-2.

(Continued)

*Primary Examiner* — James A Edwards
(74) *Attorney, Agent, or Firm* — S. Scott Foster; Kowert, Hood, Munyon, Rankin & Goetzel, P.C.

(57) ABSTRACT

An object compression system of a storage service may provide a user-friendly and cost-efficient solution to manage stored objects for users of the storage service. The object compression system may automatically monitor individual objects in an object-based storage system of the storage service. Based on one or more characteristics and additional features of the objects, the object compression system may generate respective determinations whether to compress the individual objects. Responsive to determinations to compress the objects, the object compression system may determine compression algorithms for individual objects. The object compression system may compress the objects according to respective compression algorithms to create compressed files. The object compression system may store the compressed files in a tier different from the objects and delete the objects from the storage service.

19 Claims, 7 Drawing Sheets

(56) References Cited

U.S. PATENT DOCUMENTS

| | | | | |
|---|---|---|---|---|
| 2014/0289376 | A1* | 9/2014 | Chan | H04L 67/303 |
| | | | | 709/219 |
| 2014/0351229 | A1* | 11/2014 | Gupta | G06F 16/1744 |
| | | | | 707/693 |
| 2017/0090776 | A1* | 3/2017 | Kowles | G06F 3/0619 |
| 2017/0102961 | A1* | 4/2017 | Hilemon | G06F 11/30 |
| 2018/0024752 | A1* | 1/2018 | Miller | G06F 3/0679 |
| | | | | 711/154 |
| 2018/0203636 | A1* | 7/2018 | Pulipaka | H04L 67/1097 |
| 2018/0219737 | A1* | 8/2018 | Schulz | H04L 67/1097 |
| 2018/0322040 | A1* | 11/2018 | Nikoloudakis | G06F 3/0652 |
| 2019/0235758 | A1* | 8/2019 | Constantinescu | G06F 3/0644 |
| 2019/0310919 | A1* | 10/2019 | Natanzon | G06F 3/0604 |
| 2020/0082103 | A1* | 3/2020 | Heidinga | G06F 21/54 |
| 2020/0192572 | A1* | 6/2020 | Dwarampudi | G06F 3/064 |
| 2020/0249877 | A1* | 8/2020 | McIlroy | G06F 3/0608 |
| 2020/0272566 | A1* | 8/2020 | Saeki | G06N 3/08 |
| 2020/0284883 | A1* | 9/2020 | Ferreira | G01S 7/4816 |

OTHER PUBLICATIONS

Jeff Barr, "New—Automatic Cost Optimization for Amazon S3 via Intelligent Tiering", AWS News Blog, Retrieved from https://aws.amazon.com/blogs/aws/new-automatic-cost-optimization-for-amazon-s3-via-intelligent-tiering/ on Sep. 29, 2020, Posted on Nov. 26, 2018, pp. 1-5.

* cited by examiner

STORAGE MEDIUM AND COMPRESSION FOR OBJECT STORES

BACKGROUND

Cloud storage gives users the ability to store and maintain files on remote computing systems which are generally referred to as the "cloud" or provider network. Generally, a cloud or provider network is offered and operated by a third party. The users may access the storage service of the remote cloud or provider network, e.g., via network connections. The users may pay for the storage service on an as-needed basis, e.g., based on a size of the required storage, a number of access requests to the stored files, a size of the files being accessed, and so on. Generally, when users store files on their own local or on-premise storage systems, the users can compress files themselves in order to save the storage space. However, there is no such compression system currently available for the storage service of a cloud or provider network which may automatically monitor and compress files for users. Therefore, it is desirable to provide an automatic compression system in order to improve the cost efficiency of storage services.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of an object compression system for a storage service of a cloud or provider network are described in this disclosure. In some embodiments, the object compression system may automatically monitor files or objects in various object stores over the lifecycles of the files or objects for a user, identify files or objects to be compressed, compress the identified files or objects, and move the resultant compressed files to object stores in appropriate tiers. Compared to existing storage services, the object compression system may store compressed files rather than the original (uncompressed) flies or objects, reduce the storage space for the user, and thus lower the storage cost. In addition, in some embodiments, the storage service may provide different pricing structures and/or access performance for storage in different tiers. For instance, the storage service may charge relatively high storage and/or access fees (e.g., a relatively high $/gigabyte) for files or objects stored in object stores in a standard access tier and relatively low fees (e.g., a lower $/gigabyte) for a less frequent access tier. Therefore, by moving the compressed files to the less frequently-accessed tier, the compression system may further reduce the costs for the user. In short, by automatically monitoring and compressing objects, the object compression system may provide a user-friendly and cost-efficient solution to manage stored files or objects for user of a remote storage service.

In some embodiments, the object compression system may include a monitoring system, a compression analyzing system, and a compressing and moving system. In some embodiments, the monitoring system may automatically monitor individual ones of a plurality of objects in one or more object stores of the storage service. In some embodiments, the monitoring system may create one or more characteristics associated with individual objects based on the monitoring. For instance, the characteristics may include an access pattern of a user to an object. The access pattern may indicate historically how many times the user accesses the object within one or more previous time periods, a frequency by which the user accesses the object, and the like. In some embodiments, the characteristics may include a type of the object, e.g., a JPEG file, an Excel file, or binary large object (BLOB), and so on. In some embodiments, the characteristics may further include a content type of the object, which may be indicated by a filename and/or a filename extension of the object. In some embodiments, the characteristics may further include a usage pattern of the object. The usage pattern may represent a workflow of the user with respect to the object, e.g., a set of tasks or actions performed by the user on the object. In some embodiments, the usage pattern may provide supplemental information for the access pattern of the user to the object. In some embodiments, the usage pattern may indicate one or more performance requirements of the user associated with accessing the object, e.g., requires related to latency and/or throughput. In some embodiments, the usage pattern may be obtained based on monitoring log file(s) of the object. In some embodiments, the usage pattern may be derived based on, e.g., a type of the object, a content type of the object, a size of the object, and/or usage patterns of one or more other similar objects. In addition, in some embodiments, the characteristics associated with the object may include other information, e.g., an age of the object in the storage service.

In some embodiments, the compression analyzing system may receive, from the monitoring system, the characteristics associated with individual ones of the plurality of objects. In some embodiments, the compression analyzing system may receive one or more other additional features, e.g., a risk tolerance and/or a cost sensitivity associated with compressing the object. In some embodiments, based on the characteristics and/or additional features, the compression analyzing system may generate compression decisions for individual objects using a machine learning model. For instance, the compression decision for an object may identify whether or not to compress the object. In some embodiments, responsive to a determination that the object is to be compressed, the compression analyzing system may also determine a compression algorithm appropriate according to which the object is to be compressed.

In some embodiments, the compression analyzing system may provide the compression decisions for individual ones of the plurality of objects to the compressing and moving system. In response, the compressing and moving system may compress the objects and transition the resultant compressed files to appropriate tiers, as needed. For instance, when an object is identified to be compressed by the compression analyzing system, the compressing and moving system may compress the object according to the compression algorithm determined by the compression analyzing system. In some embodiments, the compressing and moving system may store the compressed file at the current location together with the original (uncompressed) object. In some embodiments, the compressing and moving system may transit (or move) the compressed file from the current tier to another location in another tier (e.g., from the current location in a standard access tier to another location in a less frequently-accessed tier), and remove (or delete) the originally (uncompressed) object from the storage service—thus to save storage costs for the user.

Figure 1:
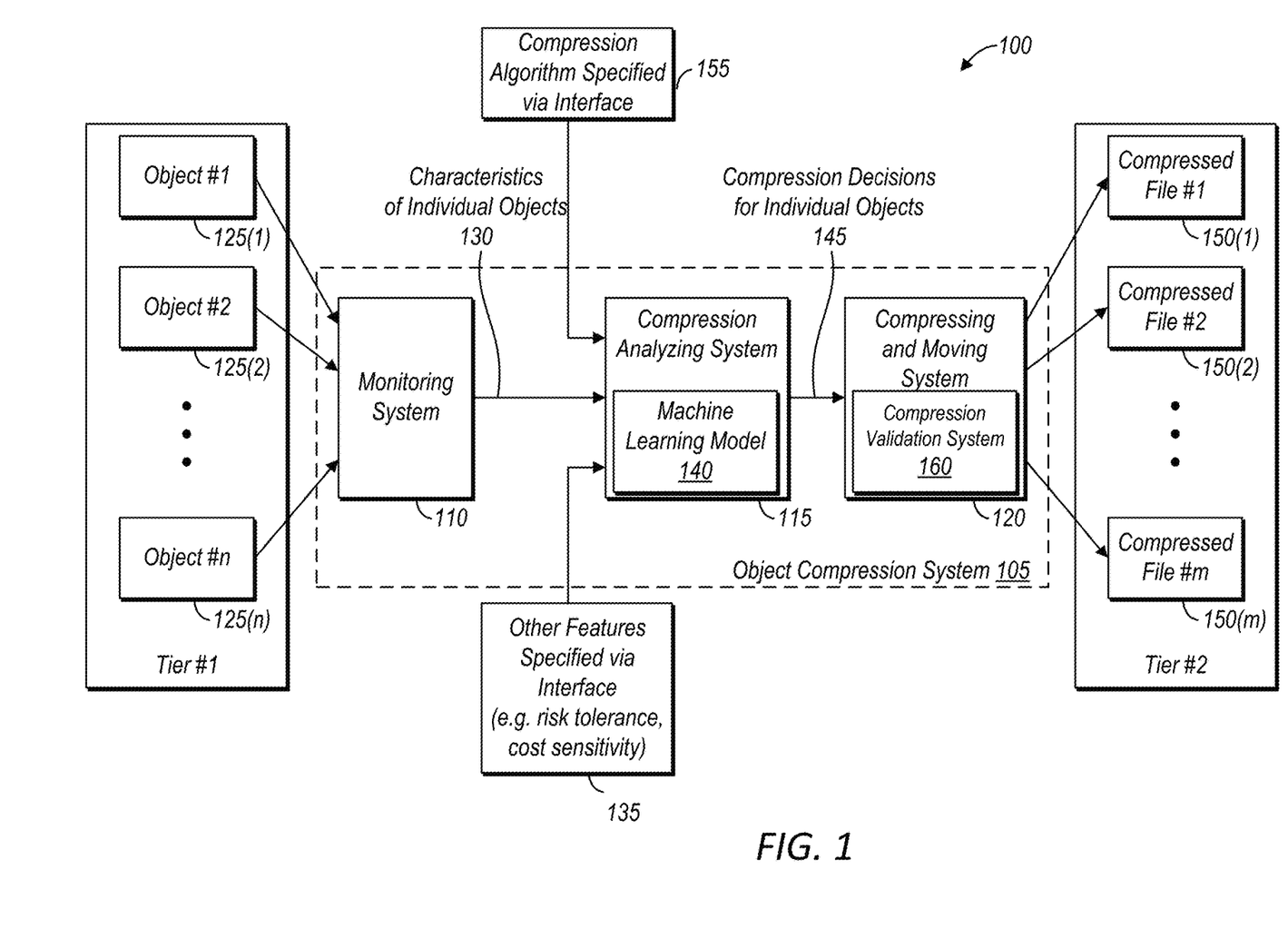
FIG. 1 shows an object compression system of a storage service, according to some embodiments.

FIG. 1 shows an object compression system of a storage service, according to some embodiments. In this example, storage service 100 may include object compression system 105. Here, the term "object" may broadly refer to any file or item stored in a storage service of a provider network. For instance, the object may include an image file, an audio or video file, a text file, a spreadsheet, and/or a file which may not necessarily be originally uploaded by the user but instead created by the storage service, e.g., a metadata file and/or an access log file associated with a user-uploaded object. In some embodiments, storage service 100 may be implemented on or across one or more computing devices of a provider network to provide object storage and/or management functions for users. In some embodiments, object compression system 105 may be implemented on or across the computing devices of storage service 100, e.g., offered as a feature of an object-based data storage system of storage service 100. In some embodiments, storage service 100 may include a plurality of objects 125(1)-125(n) stored in one or more object stores in a specific tier, e.g., tier #1. For instance, tier #1 may refer to storage medium or media and associated networking devices and/or infrastructure of storage service 100 which may be designed for users to have standard or regular accesses to stored objects, e.g., objects 125(1)-125(n). In some embodiments, storage service 100 may include at least another different tier, e.g., tier #2. For instance, tier #2 may include storage medium or media and associated networking devices and/or infrastructure for storing less-frequently accessed objects. In some embodiments, object stores in the different tiers, e.g., tier #1 vs. tier #2, may provide different access performances. For instance, tier #1 may be implemented based on flash or solid-state drives (SSDs) which may provide fast writing/reading speeds, whilst tier #2 may use less-expensive but slower storage media such as SATA drives, optical disks, tape storage systems, etc. In another example, tier #1 may include networking devices and/or infrastructure having more input/output (I/O) ports and thus provide higher networking speed and/or more networking throughput (or bandwidth) than tier #2. In some embodiments, object stores in the different tiers, e.g., tier #1 vs. tier #2, may be assigned with different pricing structures and/or access performance. For instance, storage using object stores in tier #1 may be charged with relatively high storage and/or access fees (e.g., relatively high $/gigabyte fees), whilst storage using object stores in tier #2 may require relatively low storage and/or access fees (e.g., relatively low $/gigabyte fees).

In some embodiments, object compression system 105 may include monitoring system 110, compression analyzing system 115, and compressing and moving system 120. In some embodiments, monitoring system 110 may monitor individual ones of the plurality of objects 125(1)-125(n), to obtain various characteristics or features associated with respective objects, throughout the objects' lifecycles. In some embodiments, monitoring system 110 may be configured to automatically monitor individual objects 125(1)-125(n), e.g., according to one or more default settings provided by storage system 100. In some embodiments, the user may have the option (e.g., via an interface such as a graphic interface, an API, an command line interface, and the like) to specify settings for monitoring system 110 on his/her own, and may also have the option to enable and/or disable object compression system 105, for individual objects 125(1)-125(n).

In some embodiments, monitoring system 110 may monitor an age of an object, e.g., object 125(1). The age of object 125(1) may be defined by object compression system 105 in various ways. For instance, the age may refer to how long object 125(1) has been stored in storage service 100. In another example, the age may refer to how long it has been since last time the user accessed object 125(1). In some embodiments, the age of object 125(1) may impact a compression decision for object 125(1). For instance, the older object 125(1) is in storage service 100, the more likely object compression system 105 may determine to compress object 125(1). In some embodiments, monitoring system 110 may monitor access, e.g., including one or more access patterns, of the user to object 125(1). For instance, monitoring system 110 may monitor historically a number of accesses of the user to object 125(1) in one or more previous time periods. In another example, monitoring system 110 may monitor a frequency by which the user accessed the object 125(1), e.g., an average frequency of access in last 12 weeks. In some embodiments, the access patterns may also impact the compression decision for object 125(1). For instance, when object 125(1) is less frequently accessed by the user (e.g., less below a threshold), it may become more probable for object compression system 105 to determine to compress object 125(1).

In some embodiments, monitoring system 110 may monitor a filename and/or a filename extension of object 125(1). In some embodiments, monitoring system 110 may determine a content type for object 125(1) based at least in part on the filename and/or a filename extension of object 125(1). For instance, some domain-specific datasets may use specific file formats, e.g., Telegraphic Format (TF) or GSE/IMS for seismic data. Therefore, when object 125(1) includes a filename extension of TF or GSE/IMS, monitoring system 110 may accordingly determine object 125(1) contains a seismic dataset.

In some embodiments, the content type of object 125(1) may imply a potential usage pattern by the user to access object 125(1). In some embodiments, the usage pattern may be derived based on other information, e.g., a size of the object and/or usage pattern(s) of other similar object(s) of object 125(1). Here, the term "usage pattern" may broadly refer to a workflow or a set of tasks (or actions) which the user may perform on object 125(1). In some embodiments, the usage pattern may indicate various performance requirements by the user for accessing object 125(1). For instance, when object 125(1) includes a seismic dataset, the access of the user to object 125(1) may not necessarily require a fast speed, but rather a high throughput because the seismic dataset is generally in large size. In another example, when object 125(1) includes a medical dataset, the user may require fast access with low latency in order to share the information with patients or other colleagues quickly. The performance requirements may impact how object 125(1) shall be compressed, e.g., the selection of a compression algorithm for object 125(1). For example, when object 125(1) contains seismic data, a compression algorithm may be selected to provide a small size for the compressed file to provide a good throughput. Alternatively, if object 125(1) contains medical data, a compression algorithm with fast compression and decompression speeds may be selected to provide the low latency transmission.

In some embodiments, the usage pattern may be collected by inspecting transaction log file(s) of object 125(1) by monitoring system 110. The log file(s) may provide information as to historically how the user has used object 125(1) and/or typical workflows associated with object 125(1). In some embodiments, the usage pattern of object 125(1) may also provide (supplemental) information for the access pattern of the user to object 125(1), e.g., how many times the user has used object 125(1) over a previous time period. In some embodiments, monitoring system 110 may also monitor a size of object 125(1). In some embodiments, monitoring system 110 may monitor information associated with data lineage between different objects. For instance, the data lineage may indicate that object 125(1), object 125(2), and object 125(3) are all part of a video content, and that object 125(1), object 125(2), and object 125(3) need to be played in sequence—e.g., object 125(1) is an "input" to object 125(2) whilst object 125(3) is an "output" of object 125(22). In some embodiments, the data lineage information may affect how the linked objects, e.g., object 125(1), object 125(2), and object 125(3), to be compressed (and decompressed). This may be useful, e.g., for compressing audio or video objects including streaming contents.

Figure 3:
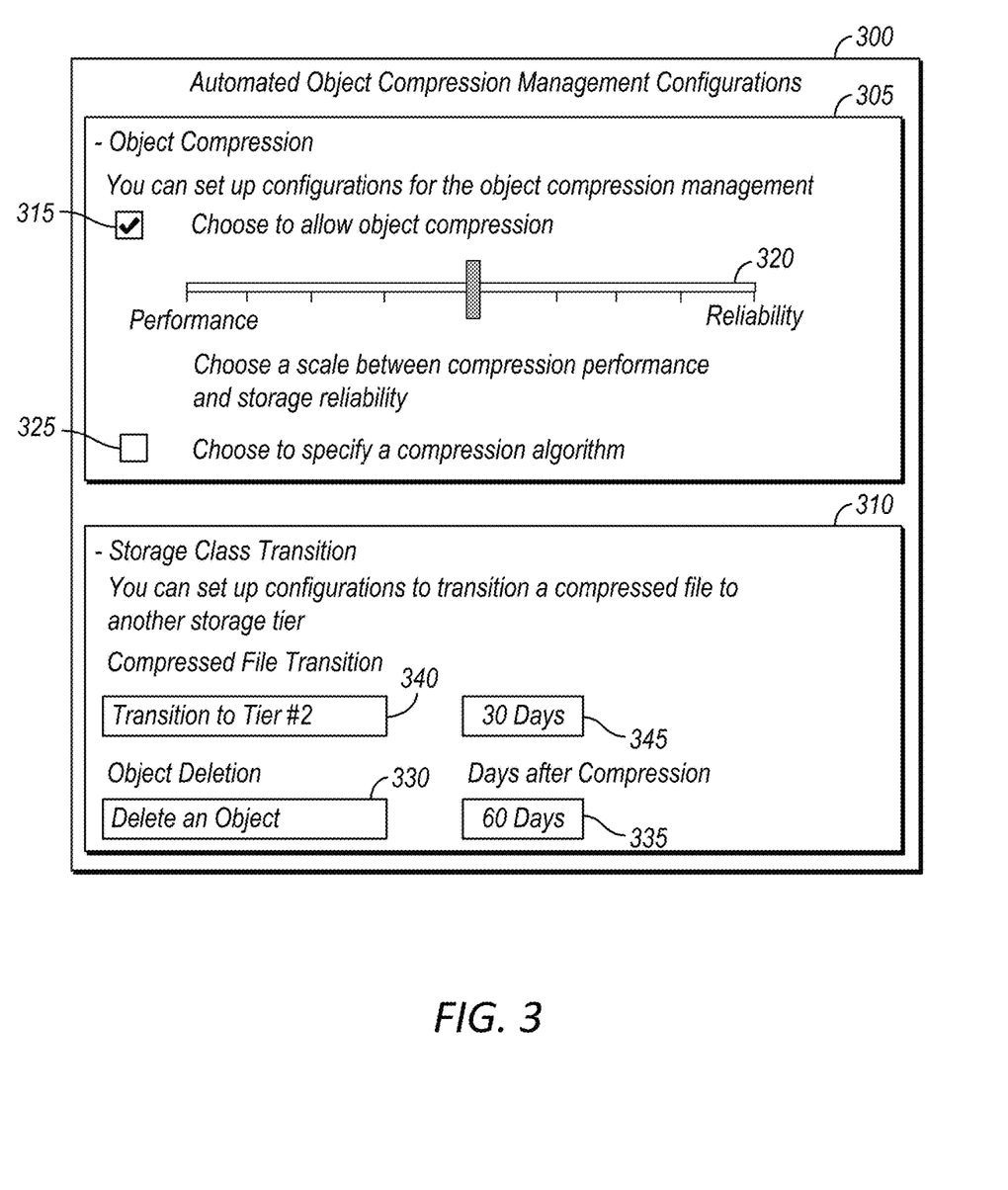
FIG. 3 shows an example user interface for set up configurations of an object compression system of a storage service, according to some embodiments.

Referring back to FIG. 1, in some embodiments, monitoring system 110 may provide characteristics associated 130 with individual ones of the plurality of objects 125(1)-125(n) to compression analyzing system 115. As described above, characteristics 130 may include, e.g., an age (e.g., a storage duration and/or a duration since last access), an access pattern (e.g., an access frequency and/or a number of accesses within an interval), a filename or filename extension (which may indicate a content type), a usage pattern (e.g., a workflow which may indicate various access performance requirements), a file size, and the like, for respective objects 125(1)-125(n). In some embodiments, compression analyzing system 115 may further receive one or more other features 135 via an interface (as shown in FIG. 3), e.g., one or more compression tolerance characteristics including a risk tolerance, a cost sensitivity, and the like. The risk tolerance may broadly refer to a level of risk (e.g., the risk of losing data or information during compression and/or decompression) for compressing an object, e.g., object 125(1). In some embodiments, the risk tolerance may include a default value provided by object compression system 105. In some embodiments, the risk tolerance may be specified by the user. The risk tolerance may impact the selection of compression algorithms for object 125(1). For instance, for a low risk tolerance, compressing analyzing system 115 may choose a compression algorithm which may split object 125(1) into multiple data blocks and compress object 125(1) block-by-block to increase the reliability. Conversely, for a high risk tolerance, compressing analyzing system 115 may instead choose a compression algorithm to minimize the size of the compressed file for object 125(1). The cost sensitivity may indicate a level of sensitivity of a user with respect to the storage and/or accessing fees. Similarly, the cost sensitivity may be set to a default value by object compression system 105 or specified by the user. In some embodiments, the cost sensitivity may also impact how object 125(1) may be compressed. For instance, for a high cost sensitivity, compressing analyzing system 115 may decide to select a compression algorithm to minimize the size of the compressed file for object 125(1). Conversely, for a low cost sensitivity, compressing analyzing system 115 may determine a compression algorithm that may optimally satisfy various performance requirements of the user to access object 125(1).

In some embodiments, compressing analyzing system 115 may use machine learning model 140 to predict future access to make respective compression decisions 145 for individual ones of the plurality of objects 125(1)-125(n). In some embodiments, machine learning model 140 may be implemented using various machine learning algorithms, e.g., a supervised neural network, an unsupervised neural network, a space vector machine, and the like. In some embodiments, machine learning model 140 of compression analyzing system 115 may receive characteristics 130 associated with individual objects 125(1)-125(n) from monitoring system 110 and additional features 135 such as the risk tolerance and/or cost sensitivity as input to predict the future access for making compression decisions 145 for respective objects 125(1)-125(n). In some embodiments, compression decision 145 for an object, e.g., object 125(1), may indicate whether object 125(1) is to be compressed. In some embodiments, when object 125(1) is identified for compression, one or more other objects in the same folder and/or object store as object 125(1) may automatically be determined for compression as well. This may be useful for objects for certain use cases or application domains. For instance, when object 125(1) relates to a legal matter and is decided to be compressed for a legal hold, other objects 125(2) and 125(3) in the same folder and/or object matter may also need to be compressed for the hold given that they all relate to the same legal matter. In some embodiments, responsive to a decision that object 125(1) is to be compressed, corresponding compression decision 145 may determine a compression algorithm for compressing object 125(1). In some embodiments, the compression algorithm may be selected from a compression algorithm catalog (not shown) within object compression system 105. In some embodiments, the catalog may include compression algorithms authenticated by storage service 100 of the provider network itself, and/or algorithms submitted by clients of storage service 100. For instance, the catalog may be "linked" to an algorithm repository where clients of storage service 100 may update various self-identified compression algorithms. In some embodiments, the compression algorithm catalog may include program instructions or executable codes for various compression algorithms including, e.g., lossless compression algorithms, lossy compression algorithms, and/or domain-specific algorithms. In some embodiments, storage service 100 may provide the user the option (e.g., via an interface such as a graphic interface, an API, a command line interface, and the like) to specify his/her own compression algorithm 155. As described above, a purpose of object compression system is to provide automated object monitoring and compression management with minimum required intervention from the client. However, the client may be aware of specific algorithms that can provide superior compression performance. Therefore, it can still be beneficial to have the ability to allow a client to specify his/her own algorithm to compress his/her objects and data.

In some embodiments, compression analyzing system 115 may also provide confidence scores for compression decisions 145. For instance, compression decision 145 may indicate that object 125(1) is identified to be compressed with 98% confidence. In some embodiments, compression analyzing system 115 may determine that the confidence score for a given object is over a threshold. This may be useful for users working with domain-specific objects because they may work better with some domain-specific compression algorithms. In some embodiments, object compression system 105 may provide a performance comparison to the user between a system-determined algorithm and a user-specified algorithm. In some embodiments, object compression system 105 may automatically select a compression algorithm from the two for the user. In some embodiments, object compression system 105 may allow the user to select a compression algorithm from the two, e.g., based on the provided comparison, to be used for compression.

As shown in FIG. 1, in some embodiments, compression analyzing system 115 may provide respective compression decisions 145 for individual objects 125(1)-125(n) to compressing and moving system 120 to perform individual compression decisions for respective objects. In some embodiments, compressing and analyzing system 120 may identify one or more objects (e.g., objects 125(1)-125(m) out of the plurality of objects 125(1)-125(n)) which are decided by compression analyzing system 115 to be compressed, and compress these identified objects according to their respective compression algorithms (e.g., selected by compression analyzing system 115 or specified by the user) to create compressed files 150(1)-150(m). In some embodiments, compressing and moving system 120 may store compressed files 150(1)-150(m) together with original (uncompressed) objects 125(1)-125(m) in their corresponding (current) object stores in tier #1. In some embodiments, after a first time period, compressing and moving system 120 may copy compressed files 150(1)-150(m) to object stores in another tier, e.g., tier #2. In some embodiments, after a second time period, compressing and moving system 120 may delete compressed files 150(1)-150(m) from tier #1 or move compressed files 150(1)-150(m) to tier #2 to replace the duplicate copies. In some embodiments, after a third time period, compressing and moving system 120 may remove or delete original (uncompressed) objects 125(1)-125(m) from tier #1, and thus retain only compressed files 150(1)-150(m) for objects 125(1)-125(m) in tier #2. These staged operations may ensure data reliability and availability for data in objects 125(1)-125(m). By storing only compressed files (e.g., compressed files 150(1)-150(m)) for objects (e.g., objects 125(1)-125(m)), object compression system 105 may reduce the storage size for the user. By transitioning compressed files from a standard access tier (e.g., tier #1) to a less expensive, less frequent access tier (e.g., tier #2), object compression system 105 may provide further cost savings for the user to use storage service 100. Note that FIG. 1 shows only two tiers, tier #1 and tier #2, for purposes of illustration. In some embodiments, storage service 100 may have more than two tiers with various pricing structures and/or access performance (by using various storage medium or media and/or associated networking devices) to accommodate various storage and accessing needs. Accordingly, in some embodiments, compression analyzing system 115 (using machine learning model 140), moving system 120, and/or another component of object compression 105 may determine a tier for storing the compressed file for a given object, e.g., based at least in part on characteristics 130, the risk tolerance, and/or the cost sensitivity of the object. Also note that the above-described monitoring, compression analyzing, and compressing and moving with regards to FIG. 1 may be performed on the object-level for individual ones of the plurality of objects 125(1)-125(n), respectively. In some embodiments, object compression system 105 may store compression decisions 145 from compression analyzing system 115 in one or more files. In some embodiments, compression analyzing system 115 and/or monitoring system 110 may access and use the information in these files to assist future compression determinations for other objects. For instance, compression analyzing system 115 or monitoring system 110 may determine to compress a future object based on previous compression decision (without necessarily predicting future access to the object using machine learning model 140), e.g., when the future object includes a similar access pattern, type, content type, and/or usage with one or more previous objects that have been decided to be compressed. This may further increase efficiency and performance of object compression system 105.

Referring back to FIG. 1, in some embodiments, compressing and moving system 120 may further include compression validation system 160. In some embodiments, a purpose of compression validation system 160 may be to validate restoration of the original, uncompressed object (e.g., object 125(1)) from the corresponding compressed version (e.g., compressed file 150(1)). This is to ensure safe and reliable storage of the object, in the compressed version and at a different data store, before deleting the object from storage service 100. In some embodiments, the validation performed by compression validation system 160 may include retrieving the compressed file (from a different data store if needed), decompressing the compressed file to generate an intermediate object, and compare the intermediate object with the original object to detect any discrepancy. In some embodiments, responsive to the validation, compression validation system 160 may provide a validation result to compressing and moving system 120. When the decompressed file passes the validation, compressing and moving system 120 may proceed to label the original object as compression-validated and delete the original object at an appropriate time as needed. Conversely, when the decompressed file fails the validation, compressing and moving system 120 may send the validation result to compression analyzing system to re-select another compression algorithm to perform the compression.

Figure 2A:
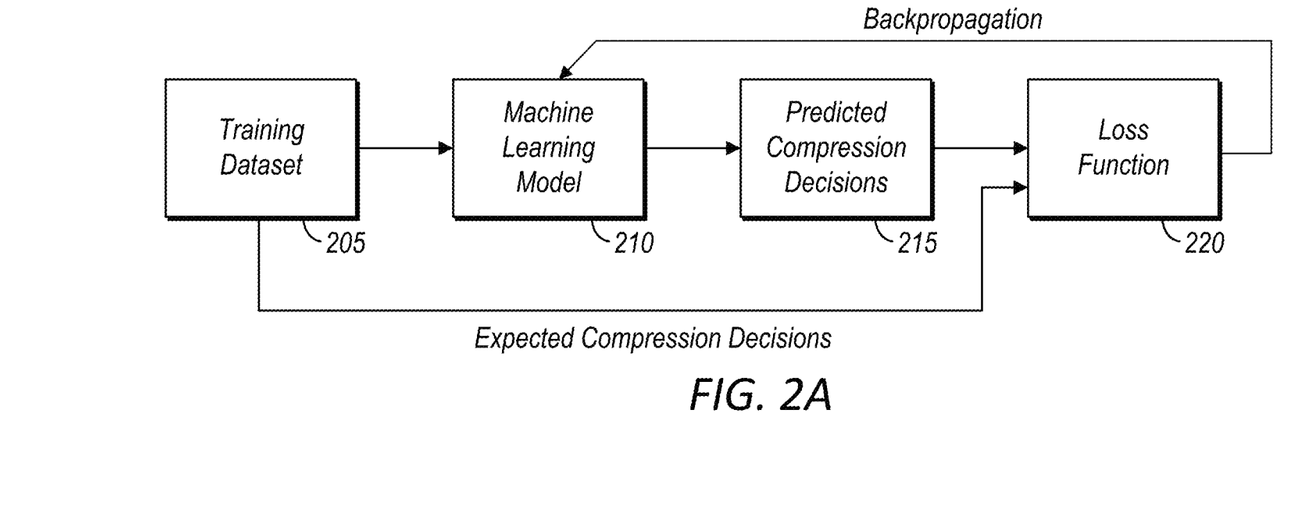
FIGS. 2A-2B show training and testing of an example machine learning model, according to some embodiments.
Figure 2B:
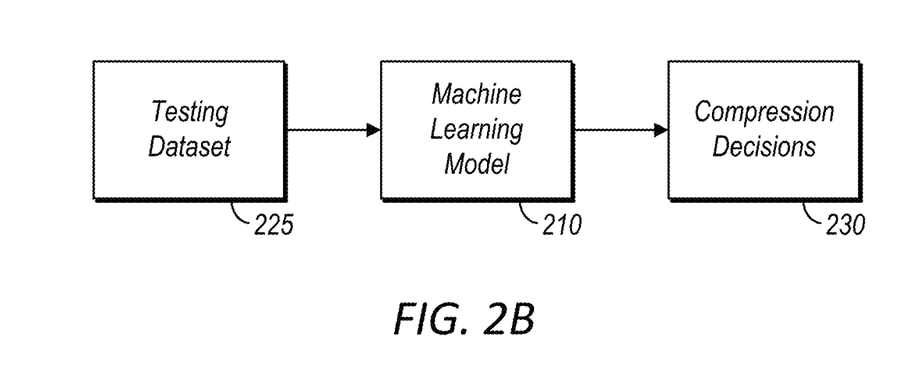

As described above, the machine learning model of the object compression system (e.g., machine learning model 140 of object compression system 105 in FIG. 1) may be implemented based on various machine learning algorithms. For instance, the machine learning model may include a feedforward neural network, a recurrent neural network, a reinforcement learning model, a generative adversarial network, a support vector machine, and the like. FIGS. 2A-2B show training and testing of an example machine learning model, according to some embodiments. In FIG. 2A, in training, machine learning model 210 may include a supervised neural network. In some embodiments, machine learning model 210 may receive training dataset 205 as input. Training dataset 205 may include, e.g., a plurality of sets of characteristics (e.g., characteristics 130 as described above in FIG. 1) and/or other features (e.g., risk tolerance and/or cost sensitivity 135) for a first plurality of objects. For each set of input for an object, training dataset 205 may also include an expected or labeled output for the object. For instance, the expected output may indicate whether the object is supposed to be compressed and, if so, at least one associated compression algorithm. In some embodiments, the expected output may also include a confidence score. In some embodiments, based on each set of the input, machine learning model 210 may predict future access to the object to make a compression decision 215 for the corresponding object. In some embodiments, in each epoch of the training, predicted compression decision 215 may be compared with the given expected output according to loss function 220. The error may be calculated to represent a discrepancy between predicted compression decision 215 and the expected output. The error may be sent back to machine learning model 210 to update parameters of machine learning model 210, e.g., according to a backpropagation function to minimize the error. The above operations may repeat for individual sets of input and expected output in training dataset 205 for individual ones of the first plurality of objects until the end of the training. In FIG. 2B, once trained, machine learning model 210 may be deployed for testing. In testing, machine learning model 210 may be applied to testing dataset 225 including characteristics (e.g., characteristics 130 as described above in FIG. 1) and/or other features (e.g., risk tolerance and/or cost sensitivity 135) associated with individual ones of a second plurality of objects to produce compression decisions for the respective objects. As described above, in some embodiments, the compression decision for each object may include a compression decision as to whether to compress the object. In some embodiments, the compression decision may also include a confidence score for the associated decision. In some embodiments, when the object is determined to be compressed, the compression decision may also determine a compression algorithm.

FIG. 3 shows an example user interface for set up configurations of an object compression system of a storage service, according to some embodiments. In this example, a user may use user interface 300 to specify various configurations for an automated object compression management system of an object-based storage system (e.g., object compression system 105 of storage service 100 in FIG. 1). For instance, user interface 300 may include two sections 305 and 310. In some embodiments, section 305 may provide an interface for the user to specify parameters related to object compressions decision-makings. For instance, the user may use checkbox 315 to enable or disable the object compression feature for one or more objects. In addition, the user may use slider 320 to choose a scale between compression performance and storage reliability. In some embodiments, the selection may be "translated" by the object compression system into one or more compression tolerance characteristics, e.g., risk tolerance, cost sensitivity, and so on. For instance, moving of slider 320 closer to "Performance" may indicate higher risk tolerance and cost sensitivity, whilst moving of slider 320 closer to "Reliability" may infer lower risk tolerance and cost sensitivity. Moreover, section 305 may provide checkbox 325 for a client to specify his/her own compression algorithm. In some embodiments, the client may specify the compression algorithm by selecting an algorithm from a drop-down menu when checking checkbox 325. In some embodiments, the client may submit a file containing program instruction or executable codes via an upload window after checking checkbox 325. In some embodiments, it may be optional for the client to specify an algorithm. Thus, unchecking of checkbox 325 may be deemed as a default value which may allow the object compression system to select and use an algorithm to compress the object. By comparison, section 310 may provide an interface for the user to specify parameters related to file transition (or moving) and clean-up after compression, according to some embodiments. For instance, the user may use dialog box 340 to specify whether to transition a compressed file from a current tier (e.g., tier #1) to a different tier (e.g., tier #2). In addition, dialog box 340 may also allow the user to select the tier where to transition the compressed file (e.g., tier #2). In some embodiments, section 310 may provide dialog box 345 for the user to specify a time period according to which to transition the compressed file. In this example, the compressed file is set to be moved to tier #2 after 30 days since creation (or compression). In some embodiments, section 310 may also provide an option for the user to specify whether to delete the original object and, if so, a time period according to which to delete the object. In this example, the original object is set to be deleted from the storage service after 60 days since compression. Note that FIG. 3 is provided merely as one example for the user interface for the disclosed object compression system of a storage service. In some embodiments, the storage service may provide an interface for the object compression system through other types of interfaces, e.g., a command line interface, an API, and the like.

Figure 4:
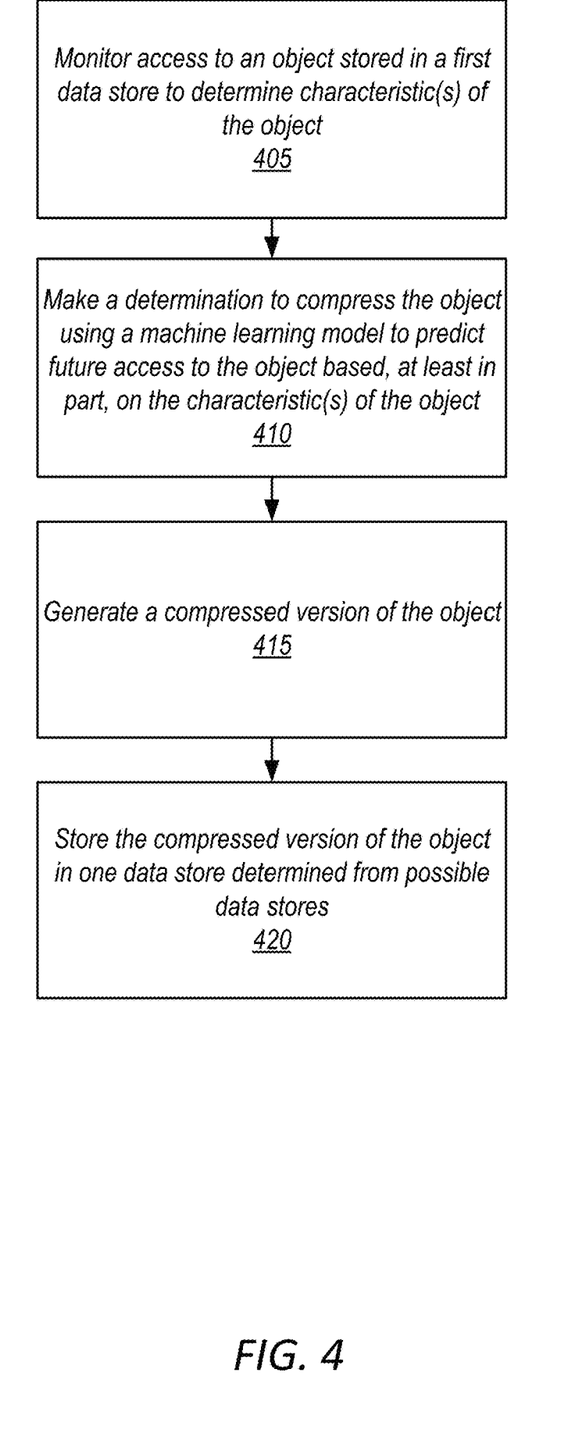
FIG. 4 a high-level flowchart for a method to automatically monitor and compress objects in a storage service, according to some embodiments.

FIG. 4 shows a high-level flowchart for a method to automatically monitor and compress objects in a storage service, according to some embodiments. In this example, the method may include monitor access to an object (e.g., object 125(1) in FIG. 1) stored in a first type of object store (e.g., a data store in tier #1 in FIG. 1) to determine one or more characteristics of the first object, as indicated by block 405. As described above, a plurality of objects (e.g., objects 125(1)-125(n) in FIG. 1) may be stored in a plurality of object stores in an object-based storage system of a storage service (e.g., storage service 100 in FIG. 1), according to some embodiments. As described above, in some embodiments, the storage service may have object stores organized into multiple tiers, e.g., tier #1 and tier #2, to meet different storage and/or accessing requirements of users. For instance, tier #1 may refer to storage medium or media and associated networking devices and/or infrastructure designed to provide standard accesses of stored objects, whilst tier #2 may refer to storage medium or media and associated networking devices and/or infrastructure for less frequency accesses. In some embodiments, the different tiers may be assigned with different pricing structures (e.g., different storage and/or accessing fees) and/or access performance for users of the storage service. In some embodiments, the different tiers of the storage service may be implemented using different types of storage medium or media. As described above, a monitoring system of an object compression system of the storage service (e.g., monitoring system 110 of object compression system 105 of storage service 100 in FIG. 1) may be used to monitor access to the individual ones of the plurality of objects to determine the respective characteristics for the individual objects. In some embodiments, the characteristics for one object (e.g., object 125(1) in FIG. 1) may indicate a frequency by which the user has historically accessed the object. In some embodiments, the access pattern may indicate a number of accesses by the user to the object within a previous interval. In some embodiments, the characteristics may also include an age (e.g., a storage duration and/or a duration since last access), a filename or filename extension (which may indicate a content type), a usage pattern (e.g., a workflow which may indicate various access performance requirements), a file size, and the like, associated with the object.

As indicated by block 410, based at least in part on the characteristics of the object, the method may include making a determination of whether to compress the object (e.g., object 125(1) in FIG. 1) using a machine learning model to predict future access to the object. As described above, this determination may be generated from a compression analyzing system of the object compression system of the storage service (e.g., compression analyzing system 115 of object compression system 105 of storage service 100 in FIG. 1), using the machine learning model (e.g., machine learning model 140 of compression analyzing system 115 in FIG. 1 and machine learning model 210 in FIG. 2). In some embodiments, besides the above characteristics, the machine learning model of the compression analyzing system may further receive one or more additional features for the object (e.g., a risk tolerance and/or a cost sensitivity). In some embodiments, the compression analyzing system may apply the machine learning model to a combination of the characteristics and additional features of the object to generate the determination of whether to compress the object. In some embodiments, responsive to a determination that the object is to be compressed, the machine learning model may further determine a compression algorithm to compress the object. In some embodiments, the machine learning model may provide a confidence score for the determination of whether to compress the object.

Referring back to FIG. 4, the method may include, responsive to a determination to compress the object (e.g., object 125(1) in FIG. 1), generating a compressed version (e.g., compression file 150(1) in FIG. 1) of the object, as indicated by block 415. In some embodiments, the method may further include determining a compression algorithm and accordingly using compression algorithm to generate the compressed version of the object. In some embodiments, the method may include storing the compressed version of the object in one data store determined from a plurality of data stores, as indicated by block 420. In some embodiments, the data store for the compression version (e.g., compression file 150(1) in FIG. 1) of the object (e.g., object 125(1) in FIG. 1) may be a second data store of a different type from the first data store storing the object. For instance, the first data store for the original, uncompressed object may be within a standard or regular access tier (e.g., tier #1 as described above), whilst the second data store for the compressed file may be within a less-frequent access tier (e.g., tier #2 as described above). In some embodiments, tier #1 and tier #2 may provide different pricing structures and/or access performance.

Figure 5:
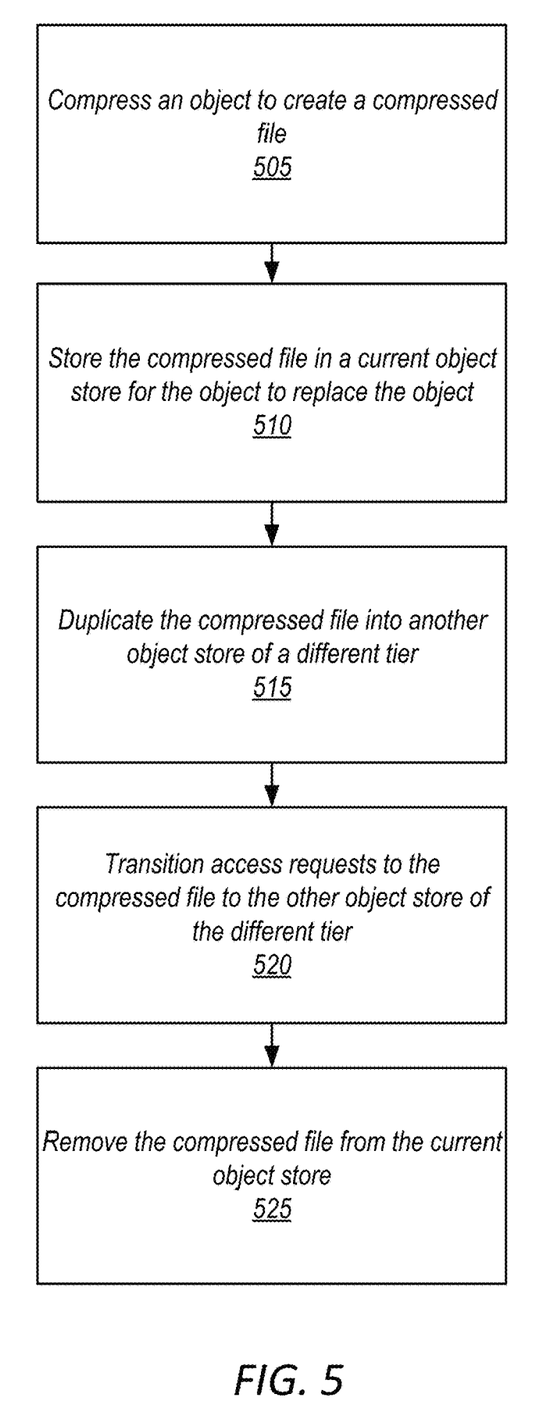
FIG. 5 shows a high-level flowchart for a method to automatically compress and transition objects in a storage service, according to some embodiments.

FIG. 5 shows a high-level flowchart for compressing and transitioning objects in a storage service, according to some embodiments. In this example, at least one of a plurality of objects in a storage service may be compressed, according to some embodiments, as indicated by block 505. As described above, in some embodiments, the object may be compressed using a compressing and moving system of an objection compression system of the storage service (e.g., compressing and moving system 120 of object compression system 105 of storage service 100 in FIG. 1). In some embodiments, the compressing and moving system may receive a compression determination from a compression analyzing system of the object compression system (e.g., compression analyzing system 115 of object compression system 105 of storage service 100 in FIG. 1). In some embodiments, the compression determination may indicate whether the object is to be compressed and, if so, determine a compression algorithm for the object. In some embodiments, responsive to the determination that the object is to be compressed, the compressing and moving system may compress the object according to the compression algorithm to create at least one compressed file for the at least one object.

As indicated by block 510, in some embodiments, the compressed file may be stored in a same object store and/or a same storage tier of the original object to replace the object store. As indicated by block 515, in some embodiments, a duplicate copy of the compressed file may be created in another object store in another storage tier different from the original object. As indicated by block 520, in some embodiments, after a time period, access requests to the compressed file may be transitioned to the other storage object store in the other storage tier. As the compressed file was already stored in the different tier transitioning from the original location to the different tier may be instantaneous from the perspective of a client application. Moreover, as the compressed file is also stored in the current object store, storage savings may be achieved without creating a significant impact upon performance to access the object (as it is still in the current object store), in the event that the object was determined for compression and movement according to an access prediction that turned out to be inaccurate. As indicated by block 525, in some embodiments, the compressed file may then be deleted from the current object store.

Figure 6:
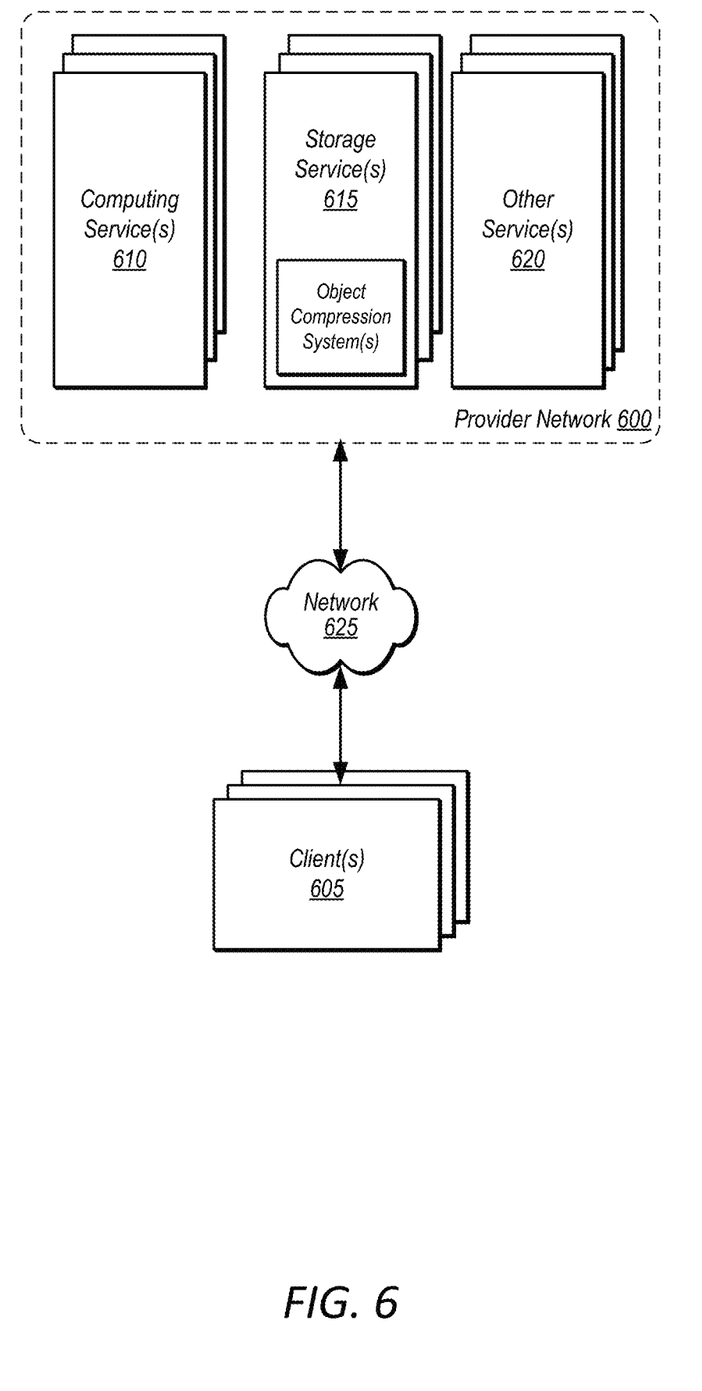
FIG. 6 shows an example provider network including a storage service, according to some embodiments.

FIG. 6 shows an example provider network including a storage service, according to some embodiments. In FIG. 6, provider network 600 may be a private or closed system or may be set up by an entity such as a company or a public sector organization to provide one or more services (such as various types of cloud-based storage) accessible via the Internet and/or other networks to one or more client(s) 605. Provider network 600 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 600. In some embodiments, provider network 600 may include various computing resources or services to implement various network-based cloud services, e.g., computing service(s) 610 (e.g., to provide virtual computing), storage service(s) 615, and/or other service(s) 620 (e.g., to provide virtual networking, virtual server(s), etc.).

Data storage service(s) 615 may implement different types of data stores for storing, accessing, and managing data on behalf of client(s) 605 as a network-based service that enables one or more client(s) 605 to operate a data storage system in a cloud or network computing environment. For example, data storage service(s) 615 may include various types of database storage services (both relational and non-relational) or data warehouses for storing, querying, and updating data. Such services may be enterprise-class database systems that are scalable and extensible. Queries may be directed to a database or data warehouse in data storage service(s) 615 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 615 may also include various kinds of object or file data stores for putting, updating, and getting data objects or files, which may include data files of unknown file type. Such data storage service(s) 615 may be accessed via programmatic interfaces (e.g., APIs) or graphical user interfaces. Data storage service(s) 615 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, one or more object compression system(s) (e.g., object compression system 110 in FIG. 1) may be implemented as part of storage service(s) 615, as shown in FIG. 6. In some embodiments, storage service(s) 615 may use the object compression system(s) to automatically monitor various objects stored in the object stores in storage service(s) 615. In some embodiments, the object compression system(s) may determine various characteristics associated with the objects based on the monitoring. In some embodiments, the object compression system(s) may also receive one or more additional features for the objects, e.g., risk tolerance(s) and/or cost sensitivity(ies). In some embodiments, the object compression system(s) may generate determinations of whether to compress the objects using machine learning model(s) (e.g., machine learning model 140 and 210 in FIGS. 1-2) based on the characteristics and additional features of the objects. In some embodiments, the object compression system(s) may further determine compression algorithms for the objects which may be identified for compression. In some embodiments, the object compression system(s) may compress the identified objects according to the compression algorithms to create corresponding compressed files. In some embodiments, the object compression system(s) may store the compressed files in object stores different from those of the corresponding original (uncompressed) objects. In some embodiments, the object stores for the compressed files and the object objects may be in different tiers of storage service(s) 615 which may be designed for different types of storage and/or access needs of client(s) 605. In some embodiments, the object compression system(s) may retain only the compressed files and delete the original objects from storage service(s) 615.

Generally speaking, client(s) 605 may encompass any type of client configurable to submit network-based requests to provider network 600 via network 625, including requests for storage services (e.g., a request to create, read, write, obtain, or modify data in data storage service(s) 610, requests to specify parameters for object compression system(s) of storage service(s) 615 (e.g., as shown in FIG. 3), etc.). For example, a given client 605 may include a suitable version of a web browser, or may include a plug-in module or other type of code module configured to execute as an extension to or within an execution environment provided by a web browser. Alternatively, a client 605 may encompass an application such as a database application (or user interface thereof), a media application, an office application or any other application that may make use of storage resources in data storage service(s) 610 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 605 may be an application configured to interact directly with provider network 600. In some embodiments, client(s) 605 may be configured to generate network-based services requests according to a Representational State Transfer (REST)-style network-based services architecture, a document- or message-based network-based services architecture, or another suitable network-based services architecture.

In various embodiments, network 625 may encompass any suitable combination of networking hardware and protocols necessary to establish network-based-based communications between client(s) 605 and provider network 600. For example, network 625 may generally encompass the various telecommunications networks and service providers that collectively implement the Internet. Network 625 may also include private networks such as local area networks (LANs) or wide area networks (WANs) as well as public or private wireless networks. For example, both a given client 605 and provider network 600 may be respectively provisioned within enterprises having their own internal networks. In such an embodiment, network 625 may include the hardware (e.g., modems, routers, switches, load balancers, proxy servers, etc.) and software (e.g., protocol stacks, accounting software, firewall/security software, etc.) necessary to establish a networking link between given client 605 and the Internet as well as between the Internet and provider network 600. It is noted that in some embodiments, client(s) 605 may communicate with provider network 600 using a private network rather than the public Internet.

Figure 7:
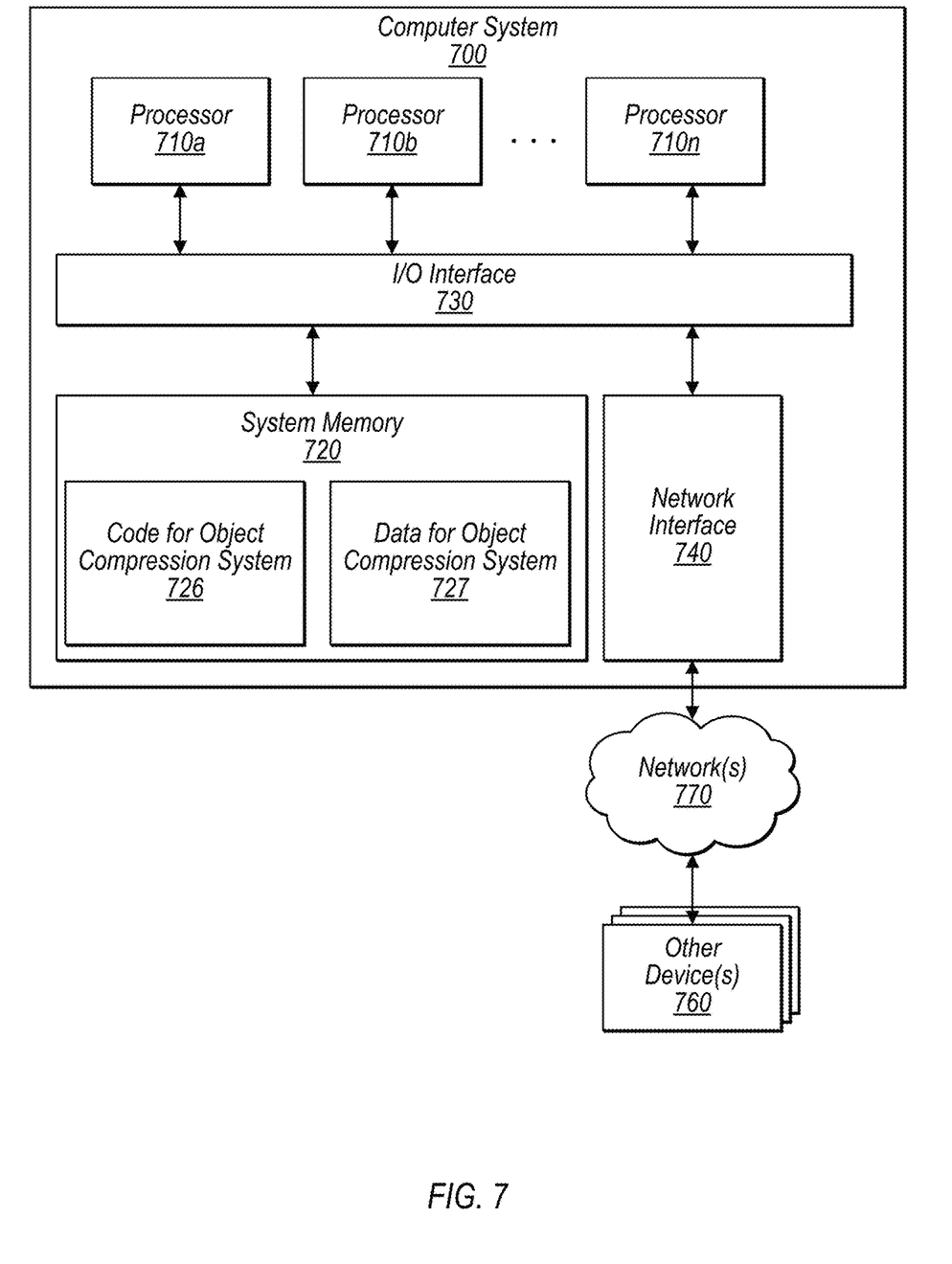
FIG. 7 shows an example computing system to implement the various techniques described herein, according to some embodiments.

FIG. 7 shows an example computing system to implement the various techniques described herein, according to some embodiments. For example, in one embodiment, object compression system 105 in FIG. 1 may be implemented by a computer system, for instance, a computer system as in FIG. 7 that includes one or more processors executing program instructions stored on a computer-readable storage medium coupled to the processors. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be one embodiment of a computer-accessible medium configured to store instructions and data accessible by processor(s) 710. In various embodiments, system memory 720 may be implemented using any non-transitory storage media or memory media, such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740. In the illustrated embodiment, program instructions (e.g., code) and data implementing one or more desired functions, such as the objection compression system described above in FIGS. 1-6, are shown stored within system memory 730 as code 726 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fiber Channel SANs, or via any other suitable type of network and/or protocol.

In some embodiments, system memory 720 may be one embodiment of a computer-accessible medium configured to store program instructions and data as described above for FIG. 1-6. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
    a plurality of computing devices, respectively comprising at least one processor and a memory, the plurality of computing devices configured to implement an object-based data storage system of a cloud-based provider network that stores a plurality of objects, wherein the object-based data storage system is configured to:
        monitor access to the plurality of objects to determine one or more characteristics of a first object of the plurality of objects stored in the object-based data storage system of the cloud-based provider network;

generate a compression decision for the first data object using a machine learning model, wherein to generate the compression decision, the machine learning model:

accepts as input the one or more determined characteristics of the first data object to incorporate a prediction of future access to the first object stored in the object-based data storage system of the cloud-based provider network as a basis for the compression decision; and wherein the compression decision generated by the machine learning model includes both an indication to compress the first data object and a compression algorithm to be performed on the first data object;

generate a compressed version of the first object according to the indication in the compression decision to perform compression on the first data object using the compression algorithm in the compression decision generated by the machine learning model; and select a different location to store the compressed version of the first object that provides different access performance than a current location of the first object.

2. The system of claim 1, wherein the object-based storage system is further configured to determine a type of the first object and wherein the machine learning model uses as further input the type of the first object to generate the compression decision.

3. The system of claim 1, wherein the object-based storage system is further configured to:

decompress the compressed version of the first object to validate restoration of the first object from the compressed version, before selecting the different location to store the compressed version of the first object.

4. The system of claim 1, wherein the object-based storage system is further configured to delete the first object after storing the compressed version of the first object.

5. The system of claim 1, wherein the object-based data storage system is implemented as part of a storage service of the cloud-based provider network and wherein the first object is identified for automated compression management via an interface for the storage service.

6. A method, comprising:

monitoring access to a first object stored in a first type of data store of a cloud-based provider network to determine one or more characteristics of the first object;

generating a compression decision for the first object using a machine learning model, wherein in generating the compression decision, the machine learning model:

accepts as input the one or more determined characteristics of the first object to incorporate a prediction of future access to the first object stored in the data store of the cloud-based provider network as a basis for the compression decision; and wherein the compression decision generated by the machine learning model includes both an indication to compress the first object and a compression algorithm to be performed on the first object;

generating a compressed version of the first object according to the indication in the compression decision to perform compression on the first object using the compression algorithm in the compression decision generated by the machine learning model; and storing the compressed version of the first object in one data store determined from a plurality of possible data stores, wherein the plurality of possible data stores includes the first type of data store.

7. The method of claim 6, wherein the method further comprises determining a type of the first object stored in the first type of data store; and wherein the machine learning model accepts as further input the type of the first data object to generate the compression decision.

8. The method of claim 6, wherein one of the one or more characteristics determined from the monitoring is a type of an application accessing the first object stored in the first type of data store.

9. The method of claim 6, wherein the one data store determined to store the compressed version of the first object is a second type of data store, and wherein the first type of data store and the second type of data store provide different respective access performance.

10. The method of claim 6, further comprising deleting the first object from the first type of data store.

11. The method of claim 6, wherein generating the compression decision is performed after expiration of a period of time specified for the first object via an interface.

12. The method of claim 6, further comprising:

making a determination to compress a second object stored in the first type of data store based, at least in part, on the compression decision made for the first object;

generating a compressed version of the second object; and storing the respective compressed version of the second object in the one data store.

13. The method of claim 6, further comprising:

validating restoration of the first object from the compressed version, before selecting the different location to store the compressed version of the first object.

14. The method of claim 6, further comprising:

receiving one or more compression tolerance characteristics via an interface, wherein the one or more compression tolerance characteristics are used as further input to the machine learning model to generate the compression decision for the first object.

15. The method of claim 6, wherein making the determination to compress the first object comprises determining that a confidence score for the prediction of future access to the first object is above a threshold.

16. One or more non-transitory computer readable media storing program instructions that when executed on or across one or more computing devices, cause the one or more computing devices to implement:

monitoring access to a first object in a first type of data store of a cloud-based provider network to determine one or more characteristics of the first object, wherein the first object is identified for automated compression via an interface; and generating a compression decision for the first object using a machine learning model, wherein in generating the compression decision, the machine learning model:

accepts as input the one or more determined characteristics of the first object to incorporate a prediction of future access to the first object stored in the data store of the cloud-based provider network as a basis for the compression decision; and wherein the compression decision generated by the machine learning model includes both an indication to compress the first object and a compression algorithm to be performed on the first object;

compressing the first object according to the indication in the compression decision to perform compression on the first object using the compression algorithm in the compression decision generated by the machine learning model; and storing the compressed first object to a second type of data store different from the first type of data store storing the first object.

17. The one or more non-transitory computer readable media of claim 16, wherein the one or more non-transitory computer readable media store further program instructions that when executed on or across the one or more computing devices, cause the one or more computing devices to further implement determining a type of the first object stored in the first type of data store; and wherein the type of the first object is further input to the machine learning model to generate the compression decision.

18. The one or more non-transitory computer readable media of claim 16, further storing program instructions that when executed on or across the one or more computing devices, cause the one or more computing devices to implement deleting the first object from the first type of data store.

19. The one or more non-transitory computer readable media of claim 16, storing further program instructions that when executed on or across the one or more computing devices, cause the one or more computing devices to further implement receiving one or more compression tolerance characteristics via an interface, wherein the one or more compression tolerance characteristics are used as further input to the machine learning model to generate the compression decision for the first object.

* * * * *